Patented Sept. 17, 1946

2,407,954

UNITED STATES PATENT OFFICE 2,407,954

LUBRICATING COMPOSITION

Merrell R. Fenske and George H. Cummings, State College, Pa., assignors to Rohm & Haas Company, Philadelphia, Pa., a corporation of Delaware No Drawing. Application May 23, 1942, Serial No. 444,262

7 Claims. (Cl. 252—52)

This invention relates to improved lubricants. In particular, it concerns lubricating compositions containing major proportions of a lubricating oil and minor proportions of an oil-soluble polymerized ester of the acrylic series and of an oil-soluble ester of a polyhydric alcohol and a long-chained fatty acid, said ester having at least one free alcoholic hydroxyl group.

It has been shown that the oil-soluble, polymerized esters of the acrylic series are valuable additives to lubricating oils since they improve the temperature-viscosity relationships of the oil, improve other lubricating characteristics of oils, depress the pour point, and keep the lubricated surfaces free from gum or other deposits. Under most conditions oils containing polymerized esters of the acrylic series are highly useful, but under certain conditions where water, moisture, or steam can come in contact with these oils, there may be formed foam or an emulsion, which may interfere with the efficiency of the oil.

It is an object of this invention to overcome these difficulties and to provide improved lubricating compositions.

It has been found that the benefits of the polymerized acrylic esters may be retained and the difficulties heretofore encountered in their use overcome by incorporating in lubricating oils along with these polymerized esters a hydrocarbon oil-soluble, alcoholic hydroxyl-containing ester of a polyhydric aliphatic alcohol and a long-chained fatty acid in an amount sufficient to overcome the emulsifying tendencies of the mixture of oil and polyacrylate alone. In general, the amount of such ester required will vary from about 0.1% to about 5% of the weight of the oil, depending upon the particular acrylic polymer used and the amount of it present in the oil.

As suitable esters having a free hydroxyl group resulting from the polyhydric alcohol there may be used the esters of such polyhydric alcohols as ethylene glycol, propylene glycol, diethylene glycol, glycerine, polyglycols, polyglycerols, pentaerythritol, mannitol, sorbitol, and the like, with fatty acids such as decoic, undecylenic, lauric, myristic, palmitic, stearic, oleic, ricinoleic, behenic, cerotic, etc. Typical esters are glycerol mono-stearate, diglycol mono-stearate, polyglycol palmitate, polyglycerol laurate, polyglycerol oleate, etc. In place of individual fatty acids there may be used mixtures of acids such as are obtained from natural glycerides.

The polymeric esters of the acrylic series which may be used in oils have in general the following basic structure—

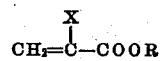

wherein X represents a hydrogen atom or a methyl group, and R is a monovalent saturated hydrocarbon radical. When polymers of simple esters are used, R must possess more than four carbon atoms and preferably from 8 to 18 carbon atoms from the hydrocarbon radical of a primary aliphatic alcohol. Typical products of this type are the polymers of amyl, hexyl, cyclohexyl, heptyl, octyl, decyl, dodecyl, cetyl or octadecyl esters of acrylic or α-methacrylic acids. A method for producing such polymers is shown in U. S. Patent 2,100,993. Mixtures of the long-chained polymers may likewise be used.

There may also be used copolymers of esters having an alcohol group with less than six carbon atoms and of esters having an alcohol group of at least five carbon atoms, as described, for example, in U. S. Patent 2,125,885. Typical of these copolymers are the products obtained by polymerizing a mixture containing cetyl α-methacrylate with a lesser amount of ethyl α-methacrylate in the presence of benzoyl peroxide. Whether copolymers or single polymers are used, the oil-soluble, polymerized esters contain alcohol groups of at least five carbon atoms.

As typical of the compositions which may be prepared, 1.3 parts of polymerized cetyl methacrylate and 0.3 part of glyceryl monoricinoleate were mixed with 98.4 parts of a Mid-Continent oil having a viscosity of 220 sec. Saybolt Universal at 100° F. and a viscosity index of 63. The additives brought the viscosity index to 96. Addition of the glyceryl monoricinoleate reduced the A. S. T. M. steam emulsion number from 1200+ to 150. Glyceryl monoricinoleate is a particularly valuable ester since it is effective for the purpose shown in unusually low proportions.

A Pennsylvania oil having a Saybolt viscosity of 275 sec. at 100° F. and a viscosity index of 100 was treated with 1.5% of polymerized octadecyl α-methacrylate and 0.5% of glyceryl monoricinoleate. The viscosity index was over 120. The A. S. T. M. steam emulsion number was reduced from over 1200 to 170 by the addition of the ricinoleate.

A copolymer of butyl methacrylate and lauryl methacrylate was dissolved in a 180 refined neutral oil to give a blend containing 1.32% of the copolymer. This blend gave stable, milky emulsions with water. Addition of 2.11% of diethyleneglycol monolaurate reduced the A. S. T. M. steam emulsion number to 156, while 2.75% reduced the emulsion number to 128.

A copolymer of cetyl methacrylate and butyl methacrylate was dissolved in a 180 Pennsylvania neutral oil to give a 2% solution thereof. The blend tended to give water-in-oil emulsions. Addition of 1% to 2% of propylene glycol monoricinoleate substantially overcame the emulsifying and foaming tendencies of the blend.

The term "lubricating oil" as used herein designates the natural or synthetic oils which are essentially hydrocarbons and which possess lubricating properties. They may be crude or refined petroleum products, hydrogenated petroleum oils, oils obtained by polymerization or condensation, etc. They may contain other additives such as anti-oxidants, additional pour-point depressors, etc.

The improved oils of this invention may be used as motor oils, gear oils, bearing oils, etc. or in greases, or as hydraulic fluids, and in similar preparations having lubricating properties.

We claim:

1. A lubricant comprising a lubricating oil and an oil-soluble, polymerized ester of the general formula—

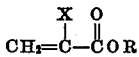

wherein X is a member of the class consisting of hydrogen and the methyl group, and R represents a saturated hydrocarbon group of at least five carbon atoms, said polymerized ester being present in an amount sufficient to improve the lubricating properties of the oil, and a hydrocarbon oil-soluble, alcoholic hydroxyl-containing ester of a polyhydric aliphatic alcohol and a long chain fatty acid in an amount sufficient to reduce substantially the emulsifying tendency of the oil containing said polymerized ester alone.

2. A lubricant comprising a lubricating oil having dissolved therein an oil-soluble, polymerized ester of the general formula—

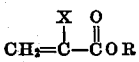

wherein X is a member of the class consisting of hydrogen and the methyl group and R represents a saturated aliphatic hydrocarbon group of at least five carbon atoms, said polymerized ester being present in an amount sufficient to improve the lubricating properties of the oil, and glyceryl monoricinoleate in an amount sufficient to reduce substantially the emulsifying tendency of oil containing said polymerized ester alone.

3. A lubricant comprising a lubricating oil having dissolved therein an oil-soluble polymerized ester of the acrylic acid series having as an alcohol residue a saturated aliphatic hydrocarbon group of at least five carbon atoms in an amount sufficient to improve the lubricating properties of the oil and of glyceryl monoricinoleate in an amount sufficient to reduce substantially the emulsifying tendency of oil containing said polymerized ester alone.

4. A lubricant comprising a lubricating oil having dissolved therein an oil-soluble, polymerized ester of $\alpha$-methacrylic acid in an amount sufficient to improve the lubricating properties of the oil and a monohydric saturated aliphatic alcohol of eight to eighteen carbon atoms and glyceryl monoricinoleate in an amount sufficient to reduce substantially the emulsifying tendency of oil containing said polymerized ester alone.

5. A lubricant comprising a lubricating oil having dissolved therein polymerized cetyl $\alpha$-methacrylate in an amount sufficient to improve the lubricating properties of the oil and glyceryl monoricinoleate in an amount sufficient to reduce substantially the emulsifying tendency of oil containing said polymerized ester alone.

6. A lubricant comprising a lubricating oil having dissolved therein a copolymer of cetyl $\alpha$-methacrylate and ethyl $\alpha$-methacrylate in an amount sufficient to improve the lubricating properties of the oil and glyceryl monoricinoleate in an amount sufficient to reduce substantially the emulsifying tendency of oil containing said polymerized ester alone.

7. A lubricant comprising a lubricating oil having dissolved therein a copolymer of cetyl $\alpha$-methacrylate and butyl $\alpha$-methacrylate in an amount sufficient to improve the lubricating properties of the oil and glyceryl monoricinoleate in an amount sufficient to reduce substantially the emulsifying tendency of oil containing said polymerized ester alone.

MERRELL R. FENSKE.
GEORGE H. CUMMINGS.